(12) United States Patent
Tian et al.

(10) Patent No.: US 12,714,020 B2
(45) Date of Patent: Aug. 25, 2026

(54) OUTDOOR WORK TOOL

(71) Applicant: Greenworks (Jiangsu) Co., Ltd., Changzhou (CN)

(72) Inventors: Bing Tian, Changzhou (CN); Zhibing Liu, Changzhou (CN)

(73) Assignee: Greenworks (Jiangsu) Co., Ltd., Changzhou (CN)

( * ) Notice: Subject to any disclaimer, the term of this patent is extended or adjusted under 35 U.S.C. 154(b) by 445 days.

(21) Appl. No.: 18/261,277

(22) PCT Filed: Jan. 29, 2022

(86) PCT No.: PCT/CN2022/074854
§ 371 (c)(1),
(2) Date: Jul. 13, 2023

(87) PCT Pub. No.: WO2022/161482
PCT Pub. Date: Aug. 4, 2022

(65) Prior Publication Data

US 2024/0074348 A1 Mar. 7, 2024

(30) Foreign Application Priority Data

Feb. 1, 2021 (CN) ......................... 202110135902.6
Feb. 1, 2021 (CN) ......................... 202110135905.X
(Continued)

(51) Int. Cl.
*A01D 34/69* (2006.01)
*A01D 34/78* (2006.01)
(Continued)

(52) U.S. Cl.
CPC ............. *A01D 34/82* (2013.01); *A01D 34/69* (2013.01); *A01D 34/78* (2013.01); *A01D 34/74* (2013.01)

(58) Field of Classification Search
CPC ........ A01D 34/82; A01D 34/69; A01D 34/78; A01D 34/74
See application file for complete search history.

(56) References Cited

U.S. PATENT DOCUMENTS 7,478,689 B1 * 1/2009 Sugden ................ B62D 51/001 180/19.3
9,867,331 B1 * 1/2018 Siudyla .................. B62D 11/04
(Continued)

FOREIGN PATENT DOCUMENTS

CN 201199799 Y * 3/2009
CN 202847459 U * 4/2013
(Continued)

OTHER PUBLICATIONS

English translation of CN-111591149-A (Year: 2020).*
(Continued)

*Primary Examiner* — Claude J Brown

(57) ABSTRACT

The disclosure provides an outdoor work tool. The outdoor work tool includes a main body, a cutter assembly, a power assembly and a traveling wheel. The cutter assembly is configured to realize functions of the outdoor work tool. The power assembly supplies power for the cutter assembly. The traveling wheel is configured to support the main body and drive the main body to move. At least two of the traveling wheels are provided with hub motors. The hub motor is an outer rotor motor. An output shaft of the hub motor is connected with the traveling wheel, so that the hub motor may rotate coaxially with the traveling wheel. An outer diameter of the traveling wheel is from 10.16 cm to 38.1 cm. A rotation speed of the hub motor is less than or equal to 563 r/min.

18 Claims, 11 Drawing Sheets

(30) Foreign Application Priority Data

Feb. 1, 2021 (CN) ......................... 202110135943.5
Feb. 1, 2021 (CN) ......................... 202120278336.X
Feb. 1, 2021 (CN) ......................... 202120279133.2
Feb. 1, 2021 (CN) ......................... 202120279138.5

(51) Int. Cl.
*A01D 34/82* (2006.01)
*A01D 34/74* (2006.01)

(56) References Cited

U.S. PATENT DOCUMENTS 10,214,869 B1 * 2/2019 Krajewski ................. E01H 5/09
2005/0067207 A1 * 3/2005 Radtke ................ B60L 15/2063 180/223
2011/0169381 A1 * 7/2011 Calley ...................... H02K 7/14 29/598
2016/0009335 A1 * 1/2016 Biderman ............... B60R 16/02 701/22
2017/0156265 A1 6/2017 Zheng et al.
2017/0361900 A1 * 12/2017 Doerksen ............. B60K 7/0007
2018/0192580 A1 * 7/2018 Zeiler .................... A01D 34/66
2019/0291779 A1 * 9/2019 Zeiler ...................... H01Q 1/27
2020/0187416 A1 * 6/2020 Jiang .................. A01D 34/6818
2020/0283086 A1 * 9/2020 Ulmen ..................... B62M 6/65

FOREIGN PATENT DOCUMENTS

CN 206099544 U * 4/2017
CN 207889522 U * 9/2018
CN 208469544 U * 2/2019
CN 209376220 U 9/2019
CN 111591149 A * 8/2020 ........... B60K 7/0007
CN 111600436 A * 8/2020 .............. A47L 11/40
CN 211741924 U * 10/2020 ............. A01D 34/69
CN 212012351 U * 11/2020
FR 2684837 A1 * 6/1993 ............. A01D 34/74
WO WO-9204817 A1 * 4/1992 ............. A01D 69/02
WO WO-9809499 A2 * 3/1998 ............. A01D 34/74
WO WO-2005102760 A1 * 11/2005 ........... A61G 5/1054
WO WO-2012164568 A1 * 12/2012 ............... B60K 6/48
WO WO-2013059914 A1 * 5/2013 ............. H02K 11/20
WO WO-2016097725 A1 * 6/2016 ............. H02K 11/33

OTHER PUBLICATIONS

English translation of CN-206099544-U (Year: 2017).*
English translation of WO-9204817-A1 (Year: 1992).*
English translation of CN-207889522-U (Year: 2018).*
English translation of CN-212012351-U (Year: 2020).*
English translation of CN-111600436-A (Year: 2020).*
English translation of CN-201199799-Y (Year: 2009).*
English translation of CN-202847459-U (Year: 2013).*
English translation of CN-211741924-U (Year: 2020).*
English translation of CN-208469544-U (Year: 2019).*
English translation of FR-2684837-A1 (Year: 1993).*

* cited by examiner

OUTDOOR WORK TOOL

TECHNICAL FIELD

The disclosure relates to an outdoor work tool, specifically relates to a lawn mower with a hub motor.

BACKGROUND

Lawn mowers are becoming more and more wildly used. The lawn mowers bring a lot of convenience, and greatly improves mowing efficiency. Conventionally, the lawn mower mostly uses a gearbox to transmit power of the motor to the driving wheels. However, as the weight of the lawn mower increases, the original gearbox structure may no longer meet the requirements of the overall performance. In addition, the structure of the multi-stage transmission enables the energy utilization efficiency to be inefficient.

In view of this, it is indeed necessary to propose improvements to the conventional lawn mowers to solve the problems mentioned above.

SUMMARY

The disclosure provides an outdoor work tool. The outdoor work tool does not need to be provided with a deceleration device, which not only saves a volume occupied by the deceleration device, enables a structure of the outdoor work tool to be more compact and saves space, but also avoids an energy loss caused by a multi-stage transmission at the same time.

The disclosure provides an outdoor work tool. The outdoor work tool includes: a main body, a cutter assembly, a power assembly, and a traveling wheel. The cutter assembly is configured to realize a mowing function of the outdoor work tool. The power assembly supplies power to the cutter assembly. The traveling wheel is configured to support the main body and drive the main body to move. At least two of the traveling wheels are provided with hub motors, the hub motor is an outer rotor motor, an output shaft of the hub motor is connected with the traveling wheel, so that the hub motor may rotate coaxially with the traveling wheel, an outer diameter of the traveling wheel is from 4 inches (10.16 cm) to 15 inches (38.1 cm), and a rotation speed of the hub motor is less than or equal to 563 r/min.

As an improvement of the disclosure, a rotation speed of the hub motor is from 100 r/min to 200 r/min.

As an improvement of the disclosure, a rated power of the hub motor is from 50 W to 120 W.

As an improvement of the disclosure, an angular velocity of the hub motor is the same as an angular velocity of the traveling wheel.

As an improvement of the disclosure, the main body is provided with a fixing assembly to fix the hub motor, the fixing assembly includes a fixing plate and a fixing base assembled and fixed with the fixing plate, the fixing plate is provided with a through hole for the output shaft of the hub motor to pass through, the fixing base is correspondingly provided with a housing hole, and the output shaft is partially housed in the housing hole after passing through the through hole to realize a connection between the hub motor and the main body.

As an improvement of the disclosure, the traveling wheel includes a pair of front wheels located on the front of the main body and a pair of rear wheels located on the rear of the main body, each rear wheel is provided with the hub motor, and the fixing assembly further includes a connecting shaft connecting the two rear wheels.

As an improvement of the disclosure, two fixing plates and two fixing bases are provided respectively, so as to correspondingly connect with the hub motors in the two rear wheels, and two ends of the connecting shaft are respectively connected with bottoms of the two fixing plates.

As an improvement of the disclosure, the connecting shaft is integrally arranged with the two fixing plates.

As an improvement of the disclosure, a first fixing component and a second fixing component are arranged on an end surface of the fixing plate on a same side, and a part of the output shaft exceeding the housing hole is housed in the first fixing component. The first fixing component and the second fixing component are both hollow structures, and a power cord in the output shaft passes through the second fixing component after passing through the first fixing component until entering into the main body.

As an improvement of the disclosure, the fixing assembly further includes a protective tube sleeved on an outside of the power cord, one end of the protective tube is connected with the first fixing component; and the other end of the protective tube passes through the second fixing component, enters the inside of the main body and is connected with the main body.

As an improvement of the disclosure, the output shaft is a hollow structure, a side wall of the output shaft is provided with a groove, a side wall of the first fixing component is provided with a U-shaped through groove, and the groove corresponds to the through groove to enable the power cord in the output shaft to pass through the first fixing component from the groove and the through groove.

As an improvement of the disclosure, an end of the output shaft is a milled structure, and a cross section of the through hole matches a cross section of the end of the output shaft.

As an improvement of the disclosure, one side of the output shaft is a flat key structure, so that a cross section of the output shaft is D-shaped, and the cross section of the through hole is correspondingly D-shaped.

As an improvement of the disclosure, the other side of the output shaft is provided with a notch, and the housing hole is U-shaped, so that when the output shaft is housed in the housing hole, an inner side wall of the housing hole is locked and fixed with the notch.

As an improvement of the disclosure, the housing hole is depressed downwardly and defined from a top of the fixing base, so that the fixing base fixes the end of the output shaft from bottom to top.

As an improvement of the disclosure, the first fixing component is integrally provided with the fixing plate, and the second fixing component fixes the fixing plate to the main body.

As an improvement of the disclosure, the second fixing component includes a fixing part passing through the fixing plate and the main body at the same time, and a locking part extending outward from the fixing part, the locking part is provided with a locking hole, and the fixing plate is correspondingly provided with a fixing hole to allow a bolt to pass through the locking holes and the fixing holes to lock and fix the second fixing component on the fixing plate.

As an improvement of the disclosure, the fixing base is further provided with a first mounting hole for a bolt to pass through, the fixing plate is correspondingly provided with a second mounting hole, so that a bolt passes through the first mounting hole and the second mounting hole to fix the fixing base with the fixing plate.

As an improvement of the disclosure, the outdoor work tool further includes a detection device, and the detection device is configured to detect a rotation speed of the hub motor.

As an improvement of the disclosure, the hub motor includes a stator, a rotor, a motor cover and a control panel, the control panel is configured to control the rotation speed and a rotation direction of the hub motor according to a detection result of the detection device, when the detection device detects that the rotation speeds of the two hub motors are inconsistent, the control panel controls each of the hub motors to reduce the rotation speed in an equal proportion.

The beneficial effects of the disclosure are: on one hand, the outdoor work tool of the disclosure is provided with the hub motor in the traveling wheel and the hub motor is set as an outer rotor motor, so that the hub motor may be configured to drive the traveling wheel to rotate, thereby realizing a self-propelled outdoor work tool. On the other hand, the hub motor may be configured to adjust a self-propelled speed of outdoor work tool. The outdoor work tool does not need to be provided with a deceleration device, which not only saves a volume occupied by the deceleration device, enables a structure of the outdoor work tool to be more compact and saves space, but also avoids an energy loss caused by a multi-stage transmission at the same time.

PART NUMBER DESCRIPTION

- 100—outdoor work tool, 7—power cord, 10—main body, 11—blade, 12—motor, 13—collection bag, 14—opening,
- 20—traveling wheel, 21—front wheel, 22—rear wheel, 221—tire, 222—air inlet, 223—first rear wheel, 224—second rear wheel,
- 30—handle assembly, 40—hub motor, 401—first hub motor, 402—second hub motor,
- 41—output shaft, 410—groove, 411—flat key structure, 412—notch,
- 50—fixing assembly, 51—fixing plate, 510—protrusion block, 511—through hole, 512—second mounting hole, 513—fixing hole, 514—connecting shaft, 515—housing cavity, 516—second sliding groove, 517—protrusion part, 52—fixing base, 521—housing hole, 522—first mounting hole, 53—first fixing component, 532—through groove, 54—second fixing component, 541—fixing part, 542—locking part, 543—locking hole, 55—first bolt, 56—second bolt, 57—protective tube,
- 61—height adjustment bracket, 62—adjustment arm, 620—positioning part, 621—matching part, 622—extending part, 623—operating handle, 624—first sliding groove, 63—gear plate, 631—gear groove, 64—elastic component, 65—pushing slider.

DETAILED DESCRIPTION

In order to enable the objectives, technical solutions, and advantages of the disclosure to be clearer, the disclosure will be described in detail below with reference to the accompanying drawings and specific embodiments.

Figure 1:
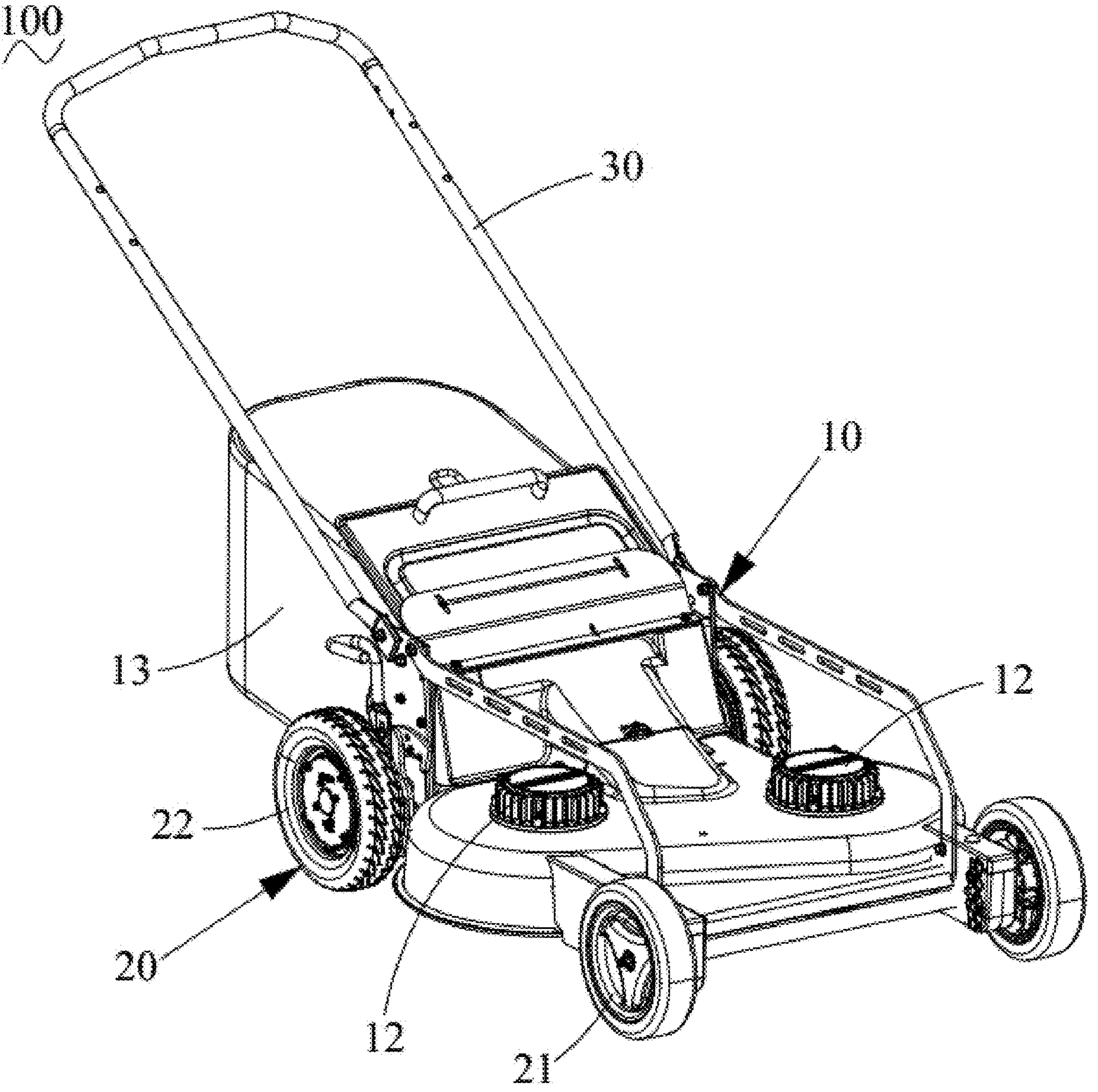
FIG. 1 is a perspective view of a lawn mower according to an embodiment of the disclosure.
Figure 2:
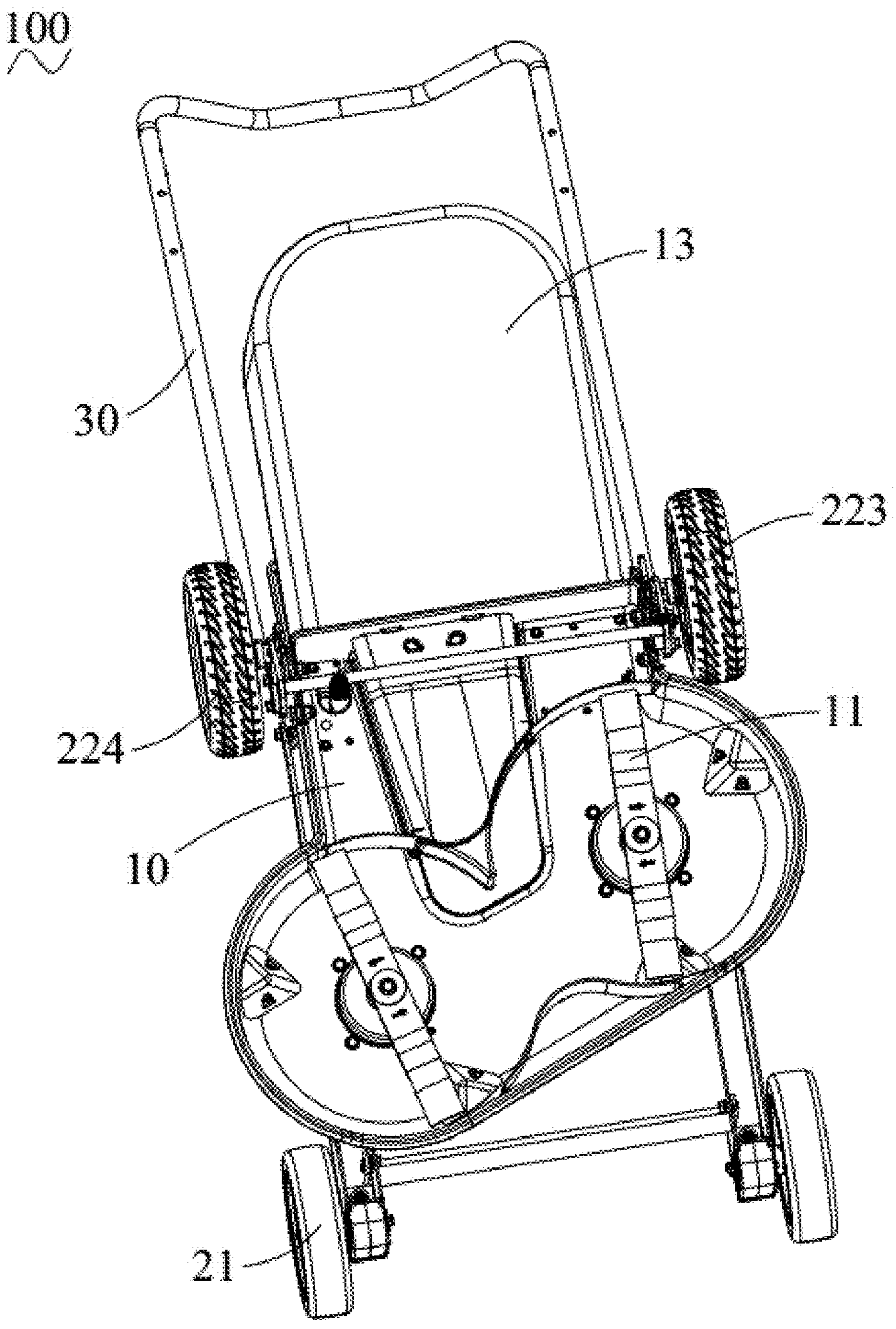
FIG. 2 is another perspective view of the lawn mower shown in FIG. 1 from another angle.

Please refer to FIG. 1 and FIG. 2. The disclosure provides an outdoor work tool 100. The outdoor work tool 100 includes a main body 10, a traveling wheel 20 and a handle assembly 30. The traveling wheel 20 is configured to support the main body 10 and drive the main body 10 to move. The handle assembly 30 is connected with the main body 10 for allowing a user to walk behind the outdoor work tool. In one embodiment, the outdoor work tool 100 is a lawn mower. The lawn mower 100 is provided with two blades 11 (which means a cutter assembly). The two blades 11 are arranged at a middle position of a bottom of the main body 10 and are staggered forward and backward. Each of the two blades 11 are independently driven by a motor 12 (which means a power assembly) to realize mowing. The motor 12 is a waterproof motor. A collection bag 13 is arranged at a rear of the lawn mower 100, so that the lawn mower 100 is provided with a grass collection function. Of course, the outdoor work tool 100 may also be a single-blade lawn mower or other types of outdoor work tools, which is not limited here.

The handle assembly 30 extends diagonally upward from a rear of the main body 10. The handle assembly 30 is provided with a control assembly (not shown), and the control assembly is configured to control a self-propelled and mowing of the lawn mower 100. In other words, on the one hand, the control assembly is configured to control a rotation speed of the two blades 11 to ensure a mowing effect. On the other hand, the control assembly is configured to control a moving speed and a moving direction of the traveling wheel 20 to ensure that the entire lawn mower 100 can move and work normally.

Please refer to FIG. 3 through FIG. 13 and combined with FIG. 1. The traveling wheel 20 includes a pair of front wheels 21 located on the front of the main body 10 and a pair of rear wheels 22 located on the rear of the main body 10. A size of each rear wheel 22 is larger than a size of each front wheel 21. The rear wheels 22 are driving wheels, each rear wheel 22 is provided with a hub motor 40, and the hub motor 40 is an outer rotor motor. An output shaft 41 of the hub motor 40 is connected with the rear wheel 22, so that the hub motor 40 may rotate coaxially with the rear wheel 22, and when the hub motor 40 is started, the rear wheel 22 may be driven to rotate, and then the main body 10 may be driven to move forward or backward. Of course, in other embodiments of the disclosure, the hub motor 40 may also be arranged in the front wheel 21. In general, there are three ways to set up the hub motor 40: 1. the hub motors 40 are arranged in the two rear wheels 22; 2. the hub motors 40 are arranged in the two front wheels 21; 3. the hub motors 40 are arranged in the two front wheels 21 and the two rear wheels 22 at the same time.

In the conventional lawn mowers, inner rotor motors are often used as self-propelled drive motors. The inner rotor motor has low cost and small size, but the inner rotor motor is provided with a high speed and small torque. When the inner rotor motor is used as a self-propelled drive motor of the lawn mower, a gearbox should be provided to reduce an output speed and increase the torque. If the gearbox is not used, a self-propelled speed of the lawn mower will be too fast. On the one hand, it is easy for the lawn mower to hit obstacles due to untimely braking. On the other hand, when the lawn mower is self-propelled, blades of the lawn mower are working at the same time. If the self-propelled speed is too fast, a mowing effect will be unsatisfactory, and lawn will be sometimes dense and sometimes sparse when mowing, which causes the lawn is not beautiful enough. Therefore, in one embodiment, after the hub motor 40 is designed as the outer rotor motor, due to its low speed and large torque, there is no need to provide a deceleration device, and the hub motor 40 directly drives the rear wheel 22 to rotate, so as to realize moving and an adjustment of a moving speed of the lawn mower 100. Compared with the conventional art, it not only saves a volume occupied by the deceleration device, enables a structure of the lawn mower 100 to be more compact and save space, but also avoids an energy loss caused by a multi-stage transmission at the same time.

In some embodiments, the hub motor 40 is coaxial with the rear wheel 22, and the rear wheel 22 is mounted on an outer rotor of the hub motor 40. An angular velocity of the hub motor 40 is the same as an angular velocity of the rear wheel 22, and when an outer diameter of the rear wheel 22 is from 4 inches to 15 inches, a rotation speed of the hub motor 40 is less than or equal to 563 r/min. In some embodiments, when the outer diameter of the rear wheel 22 is from 4 inches (10.16 cm) to 15 inches (38.1 cm), the rotation speed of the hub motor 40 is from 100 r/min to 200 r/min. In an embodiment of the disclosure, the rotation speed of the hub motor 40 is 120 r/min. It is understandable that although the rotation speed of the hub motor 40 may be set to be high, when the rotation speed of the hub motor 40 is too high, the user will not be able to keep up with the moving speed of the lawn mower 100. After a large number of experiments, it is shown that when the outer diameter of the rear wheel 22 is from 4 inches to 15 inches, a maximum of the rotation speed of the hub motor 40 does not exceed 563 r/min.

In summary, when the hub motor 40 is used on a driving wheel of the lawn mower 100, especially a walk-behind lawn mower, it is necessary to consider a limitation of many factors and design the outer rotor hub motor 40 with special parameters to be used on the stepping lawn mower. In an embodiment of the disclosure, a rotation speed of the hub motor 40 is selected in a range of 100 r/min to 200 r/min, and a rated power of the hub motor 40 is from 50 W to 120 W, so that the moving speed may meet a mowing requirement of the lawn mower 100. In addition, the rated power of the hub motor 40 is limited from 50 W to 120 W, so as to avoid excessive power consumption which affects a normal working time of the lawn mower 100. In order to prevent the hub motor 40 from being too large or too small to affect a self-propelled performance, a diameter of the driving wheel of the lawn mower 100 is set to be from 4 inches (10.16 cm) to 15 inches (38.1 cm).

In some embodiments, the hub motor 40 is disc-shaped, and the outer diameter of the rear wheel 22 is larger than a diameter of the motor mounted on a wheel axle of the rear wheel, so that a thickness of the rear wheel 22 may be designed to be thinner, thereby reducing a width of the hub motor 40, and preventing the rear wheel 22 from exceeding a cutting area of the blades.

The hub motor 40 is completely housed in the rear wheel 22, which can reduce a volume occupation. The rear wheel 22 further includes a tire 221 arranged on an outside of the hub motor 40. The tire 221 is provided with an air inlet 222 so that the tire 221 may be inflated by an inflator to achieve an effect of cushioning and shock absorption. In some embodiments, the tire 221 is a vacuum tire, but it should not be limited here. In other embodiments, the tire 221 may also be a non-pneumatic tire with a cavity structure.

The hub motor 40 includes a stator, a rotor, a motor cover, and a control panel, and the control board is configured to control the rotation speed and a rotation direction of the hub motor 40. The rear wheel 22 includes a first rear wheel 223 and a second rear wheel 224 which are separately arranged on both sides of the main body 10. A distance between the first rear wheel 223 and the second rear wheel 224 is smaller than a width of the main body 10, so as to prevent an excessive distance between the two rear wheels from affecting a mowing range of the lawn mower 100.

In some embodiments, the first rear wheel 223 is provided with a first hub motor 401. The second rear wheel 224 is provided with a second hub motor 402. When a rotation speed of the first hub motor 401 is different from a rotation speed of the second hub motor 402, the rotation speeds of the first rear wheel 223 and the second rear wheel 224 are different, and a turning of the lawn mower 100 may be realized at this time (turn left or right). When a rotation direction of the first hub motor 401 is different from a rotation direction of the second hub motor 402, the rotation directions of the first rear wheel 223 and the second rear wheel 224 are different. Then the lawn mower 100 may realize a zero turn, which means a turn in place. Of course, in other embodiments, the hub motor 40 may be provided only in the first rear wheel 223 or in the second rear wheel 224, as long as the two rear wheels 22 may rotate synchronously, it is not limited herein.

In an embodiment of the disclosure, the rotation speed of the hub motor 40 is at least partially correlated with a rotation speed of the blade 11. When the moving speed of the lawn mower 100 becomes faster, which means when the rotation speed of the hub motor 40 is high, the rotation speed of the blade 11 also needs to be increased to avoid an uneven mowing. When the moving speed of the lawn mower 100 slows down, the rotation speed of the blade 11 also needs to be reduced. It means that in different mowing modes of the lawn mower 100, the rotation speed of the blade 11 is different, and the rotation speed of the hub motor 40 is also correspondingly different, so as to match the mowing mode.

In an embodiment of the disclosure, the lawn mower 100 is provided with a detection device (not shown), which may detect the rotation speeds of the two hub motors 40. When the detection device detects that the rotation speeds of the two hub motors 40 are not the same, it means that the lawn mower 100 is turning, the detection device sends a signal to the control panel of the hub motor 40, the control board controls the hub motor 40 to run at a low speed, so as to avoid a danger caused by excessive speed when turning. In a low-speed operation mode, the rotation speed of the hub motor 40 is lower than 100 r/min. In order to ensure that the turning is not affected, the rotation speeds of the two hub motors 40 are reduced in equal proportions. For example, when the lawn mower 100 turns to left, the rotation speed of the hub motor 40 on the left is 100 r/min, and the rotation speed of the hub motor 40 on right is 150 r/min. The rotation speeds of the hub motor 40 on the left and right are reduced in proportion by 50%. At this time, the rotation speed of the hub motor 40 on the left is 50 r/min, and the rotation speed of the hub motor 40 on the right is 75 r/min, which does not affect the turning of the lawn mower 100. Of course, a reduction ratio may also be other ratios, and is not limited to the value in this embodiment.

Figure 3:
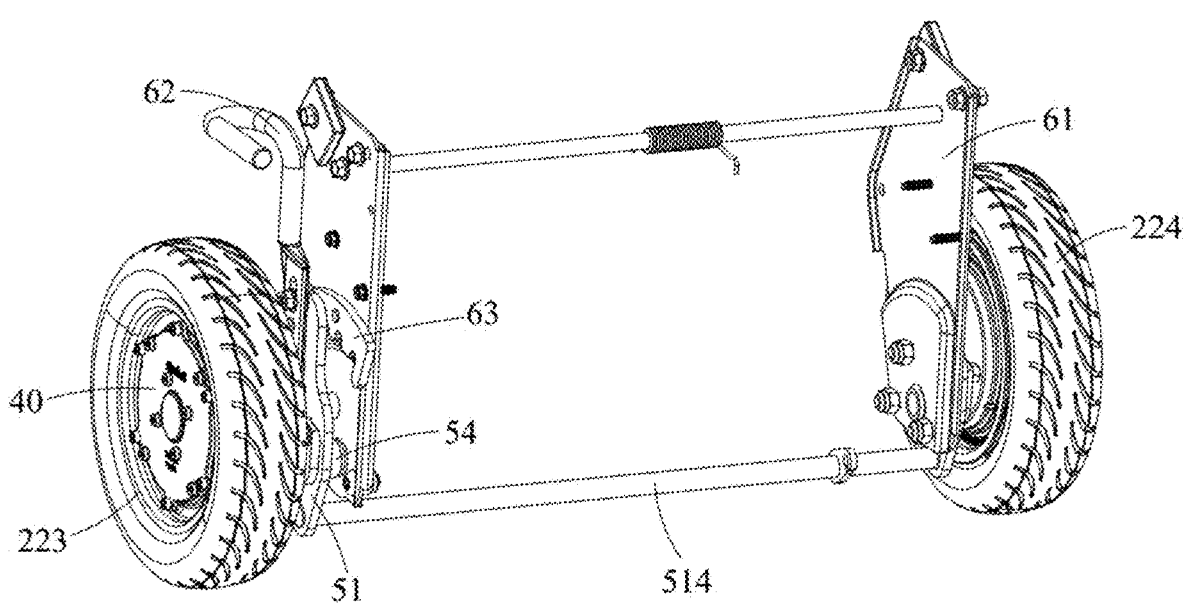
FIG. 3 is a structural schematic view of a rear wheel and a hub motor in FIG. 1.
Figure 4:
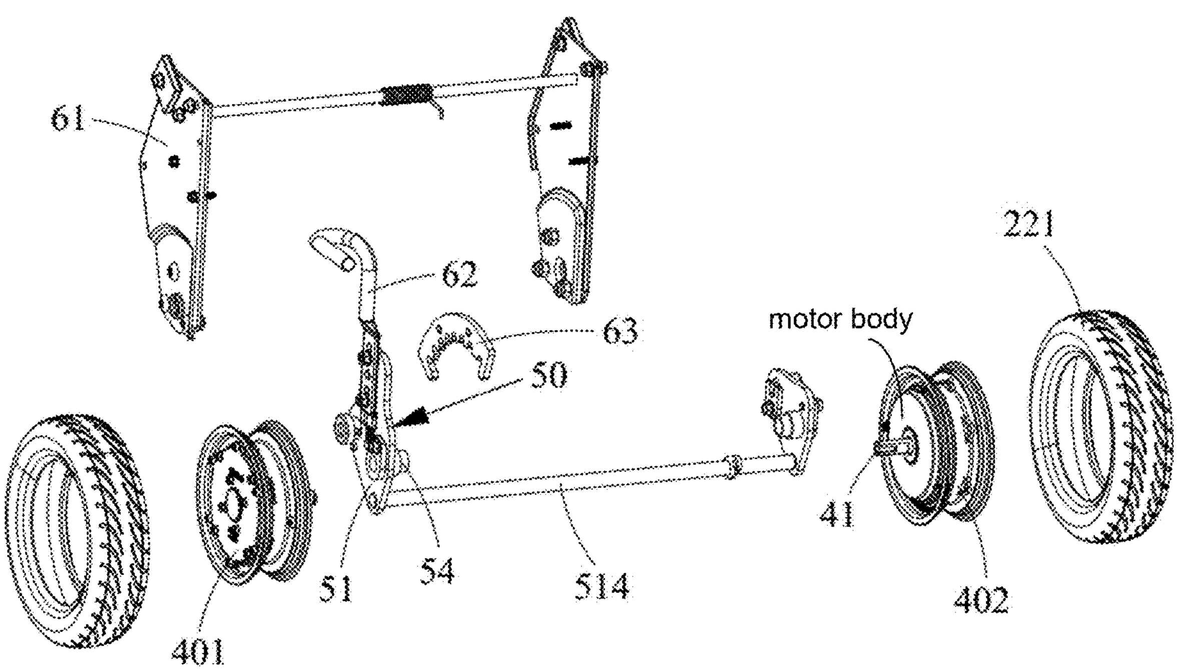
FIG. 4 is an exploded view of FIG. 3.
Figure 5:
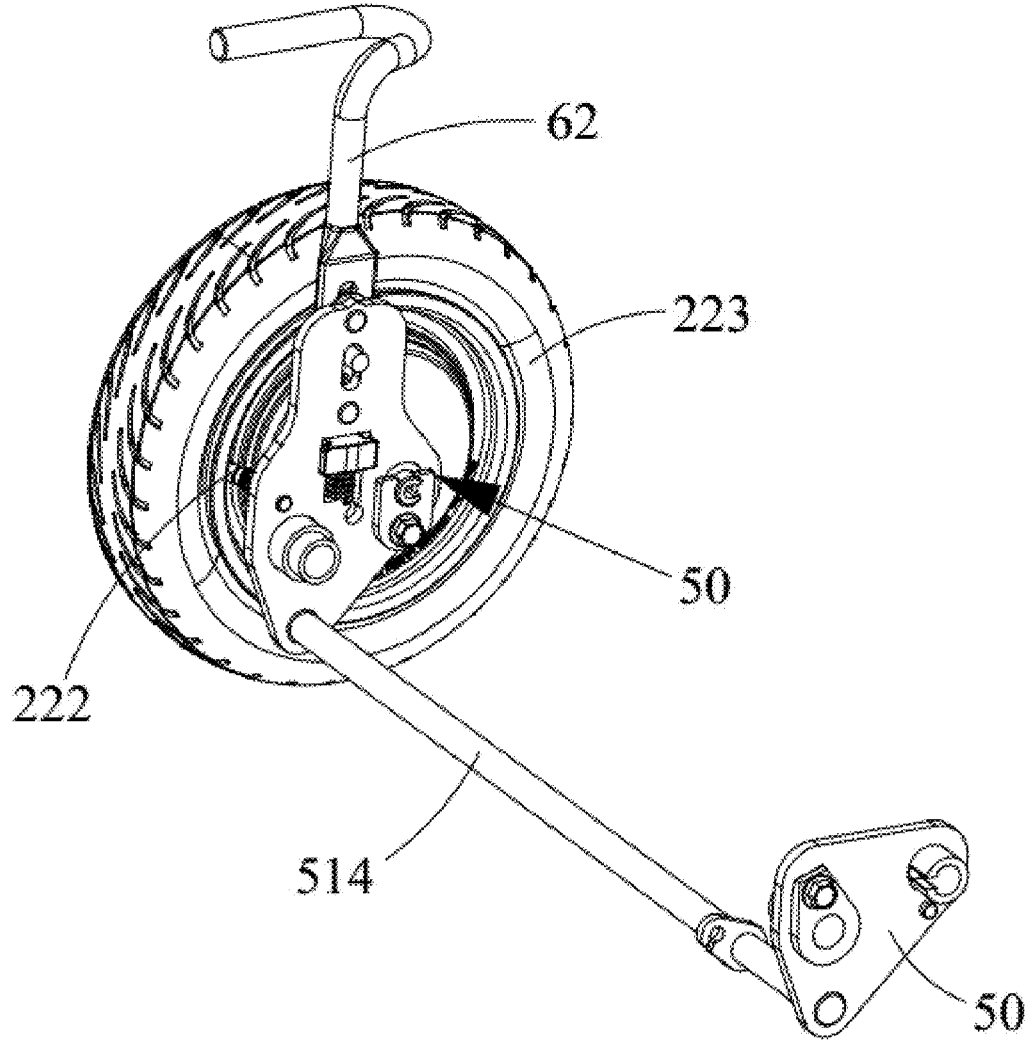
FIG. 5 is an assembled structural view of a first rear wheel and a fixing assembly in FIG. 4.
Figure 6:
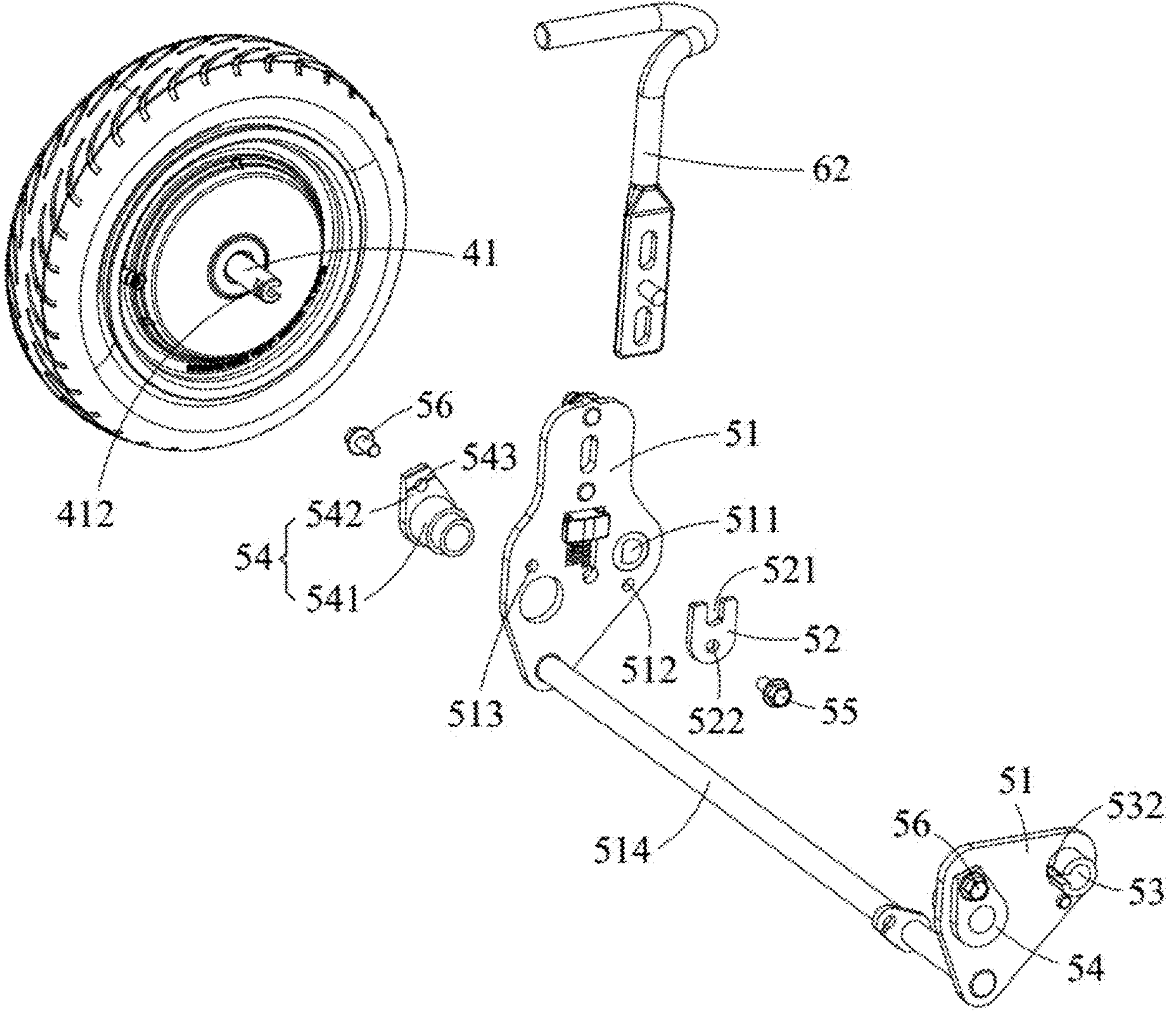
FIG. 6 is an exploded view of FIG. 5.
Figure 7:
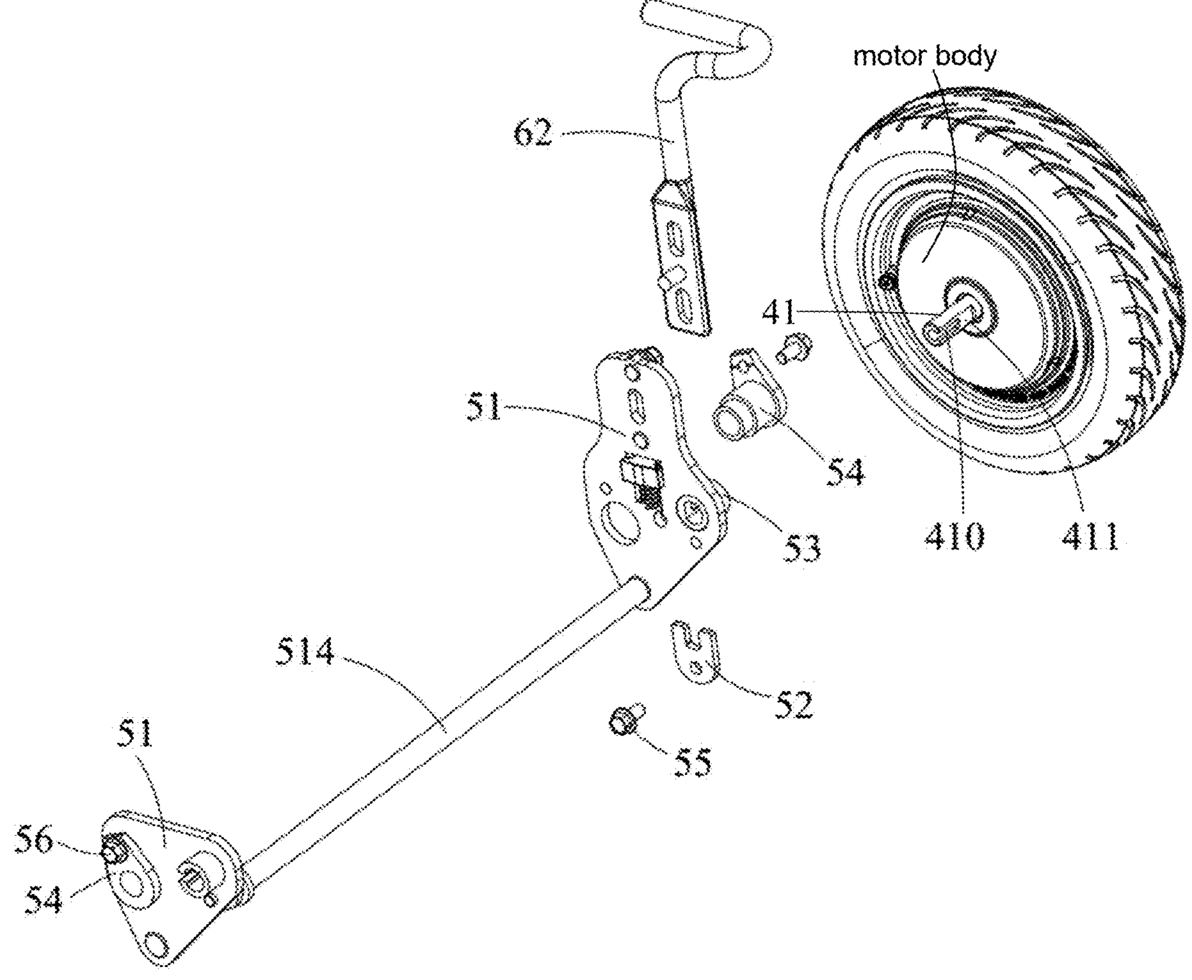
FIG. 7 is a schematic view of FIG. 6 from another angle.
Figure 8:
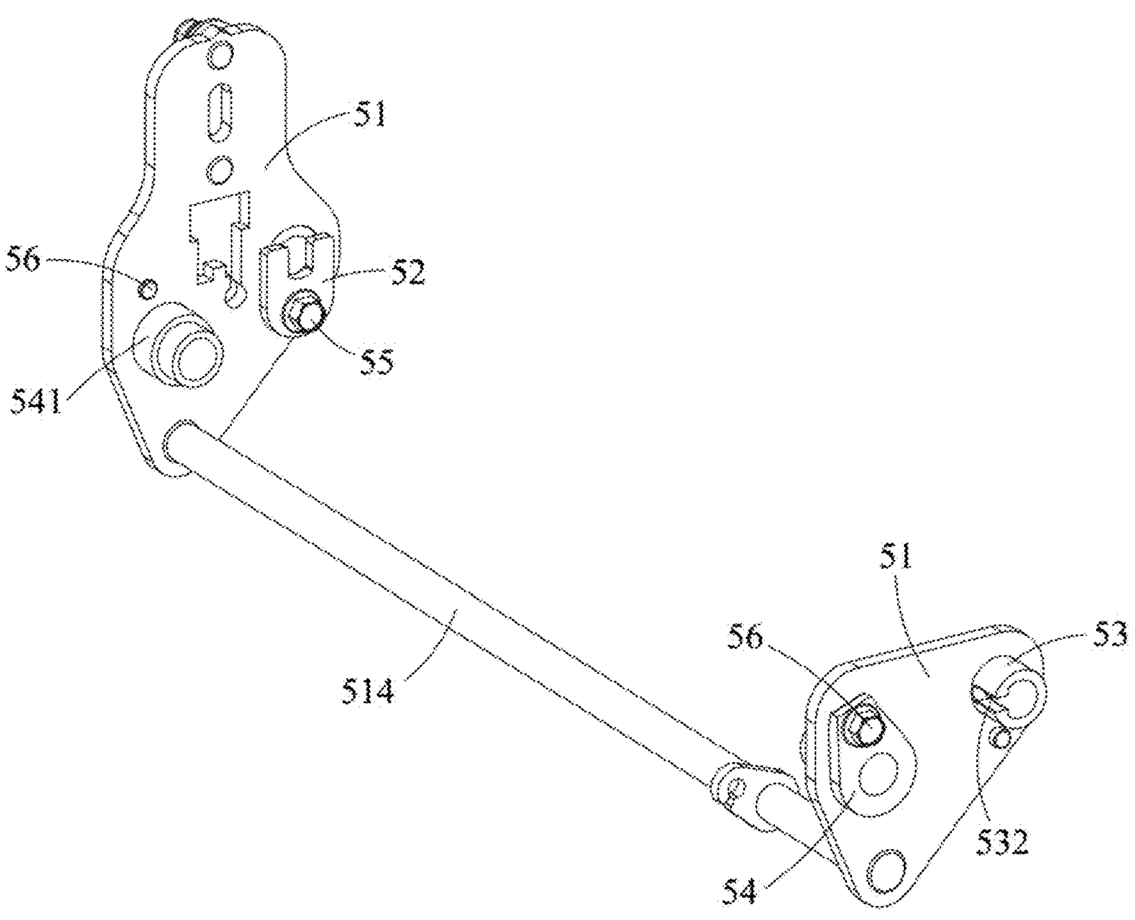
FIG. 8 is a structural schematic view of the fixing assembly in FIG. 6.
Figure 9:
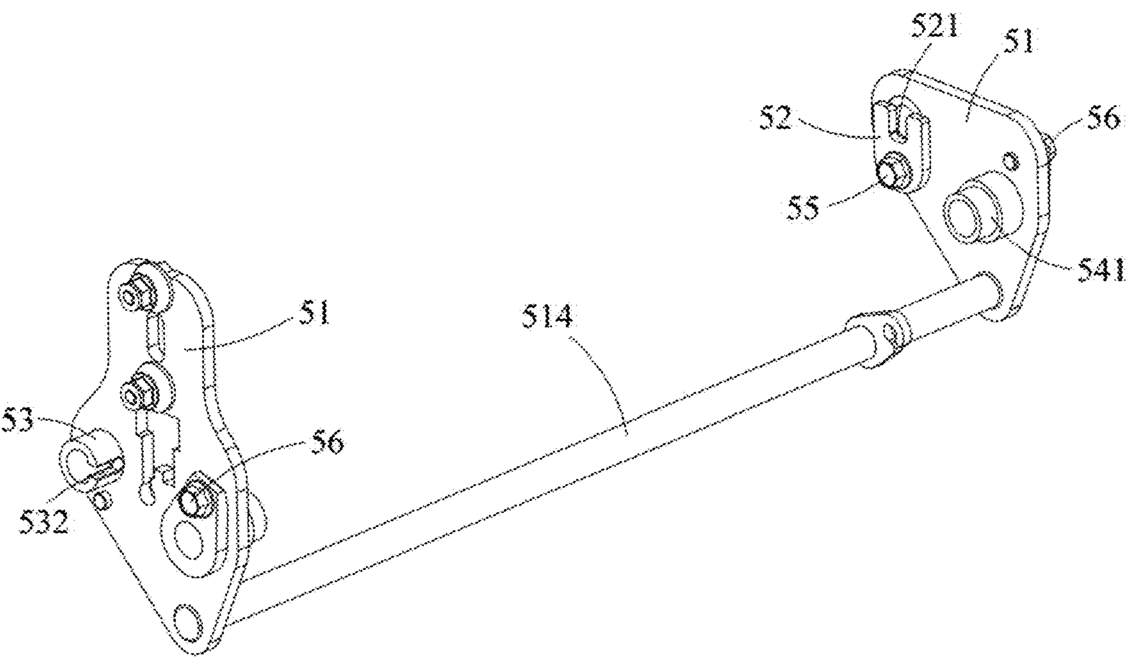
FIG. 9 is a schematic view of FIG. 8 from another angle.

The main body 10 is provided with a fixing assembly 50 for fixing the hub motor 40. The fixing assembly 50 includes a fixing plate 51, a fixing base 52 assembled and fixed with the fixing plate 51, and a first fixing component 53 and a second fixing component 54 located on the fixing plate 51. The first fixing component 53 matches the fixing base 52 to fix the rear wheel 22 to the fixing plate 51. The fixing plate 51 is provided with a through hole 511 for the output shaft 41 of the hub motor 40 to pass through. The fixing base 52 is correspondingly provided with a housing hole 521 for housing the output shaft 41 of the hub motor 40, so that the output shaft 41 may be limitedly housed in the housing hole 521 after passing through the through hole 511 to realize a fixed connection between the hub motor 40 and the fixing plate 51 and a fixed connection between the rear wheel 22 and the fixing plate 51. As shown in FIG. 3 and FIG. 4, a height adjustment bracket 61 is fastened and fixed on a housing of the main body 10 by bolts. One end of the second fixing component 54 passes through the height adjustment bracket 61 and is buckled and fixed with the height adjustment bracket 61, and the other end of the second fixing component 54 is locked and fixed with the fixing plate 51. In this way, the second fixing component 54 may be configured to connect the fixing plate 51 with the main body 10 of the lawn mower 100, which not only realizes a relative fixation between the hub motor 40 and the main body 10, and a relative fixation between the rear wheel 22 and the main body, but also provides a basis for a height adjustment of the lawn mower 100.

An end of the output shaft 41 is a milled structure. A cross section of the through hole 511 matches a cross section of the end of the output shaft 41, so as to ensure that the output shaft 41 may pass through the through hole 511. The output shaft 41 is arranged in a cylindrical shape as a whole. From a perspective of a normal use of the output shaft 41, one side of the output shaft 41 is in a flat key structure 411 (which means that an outer wall surface on one side of the output shaft 41 is a flat surface), and the other side of the output shaft 41 is provided with a notch 412, and the flat key structure 411 is arranged opposite to the notch 412. With an arrangement of the flat key structure 411, on the one hand, it enables the cross section of the end of the output shaft 41 to be D-shaped, and the cross section of the through hole 511 is also D-shaped, so as to ensure that the output shaft 41 can smoothly pass through the through hole 511 and prevent the output shaft 41 from rotating. On the other hand, it is also convenient to provide a groove 410 on the flat key structure 411 so that a power cord 7 inside the hub motor 40 may pass through the groove 410 of the output shaft 41.

The housing hole 521 is U-shaped. The notch 412 is depressed inwardly from an outer wall of the other side of the output shaft 41. With an arrangement of the notch 412, when the output shaft 41 is housed in the housing hole 521, an inner side wall of the housing hole 521 and the notch 412 are matched and fixed to limit the output shaft 41 and prevent the output shaft 41 from being removed from the fixing base 52. In other words, a use of a mutual matching of the flat key structure 411 and the through hole 511 may prevent the output shaft 41 from rotating. And the mutual matching of the notch 412 and the housing hole 521 may prevent the output shaft 41 from sliding left and right.

In one embodiment, the housing hole 521 is depressed downwardly from a top of the fixing base 52, so that the end of the output shaft 41 may be fixed from a bottom of the fixing base 52 to fix the end of the output shaft 41 in the housing hole 521. In other words, a width of the housing hole 521 is smaller than a diameter of the output shaft 41. In order to limit the output shaft 41 with the housing hole 521, the best way is to limit the output shaft 41 in the housing hole 521, and to enable the notch 412 exactly correspond to the inner side wall of the housing hole 521. At this time, the notch 412 and the housing hole 521 may be used to fix and limit the output shaft 41, which ensures a stability of the output shaft 41.

The fixing base 52 is further provided with a first mounting hole 522 for a first bolt 55 to pass through. The fixing plate 51 is provided with a second mounting hole 512 correspondingly, so that the first bolt 55 may be configured to pass through the first mounting hole 522 and the second mounting hole 512 to fix the fixing base 52 with the fixing plate 51. In this way, the hub motor 40 may be fixed, an operation is simple and convenient, and maintenance is more simple and convenient. In some embodiments, the first mounting hole 522 is located below the housing hole 521. Of course, in other embodiments, a location of the first mounting hole 522 may be determined according to actual conditions, which is not limited herein. In addition, a fixing method between the fixing base 52 and the fixing plate 51 may also be other method, such as: buckle fixing, sticking fixing, etc., which will not be illustrated one by one herein.

In an embodiment of the disclosure, since each rear wheel 22 is provided with a hub motor 40, there are two corresponding fixing plates 51 and fixing bases 52, so as to be fixedly connected with the hub motors 40 in the two rear wheels 22 correspondingly, which realizes a fixation of the hub motors 40 in the two rear wheels. The fixing assembly 50 also includes a connecting shaft 514. The connecting shaft 514 is configured to connect the two rear wheels 22 to further ensure that the two rear wheels 22 can rotate synchronously relative to the connecting shaft 514 in a process of a height adjustment. Two ends of the connecting shaft 514 are respectively connected with bottoms of the two fixing plates 51. In some embodiment, the connecting shaft 514 is integrally provided with the two fixing plates 51. Of course, the connecting shaft 514 may also be locked, or buckled or pasted with the two fixing plates 51, and the specific fixing method is not limited herein.

For the lawn mower 100, it is necessary to be provided with a height adjustment function, which means that the height of the rear wheel 22 relative to the lawn mower 100 may be changed. Therefore, it is necessary to design the power cord 7 and a control line of the hub motor 40 to ensure that a movement of the rear wheel 22 will not pull the power cord 7 and also ensure that the power cord 7 cannot be too long to avoid being caught by objects on the lawn. In order to achieve this objective, the disclosure uses the first fixing component 53 and the second fixing component 54 to design a routing mode of the power cord 7.

Since there are two fixing plates 51 and two fixing bases 52 respectively, there are two first fixing components 53 and two second fixing components 54 respectively to assemble the power cord 7 of the two hub motors 40. Specific structures of the first fixing component 53 and the second fixing component 54 and a specific routing method of the power cord 7 will be described in detail below.

Figure 12:
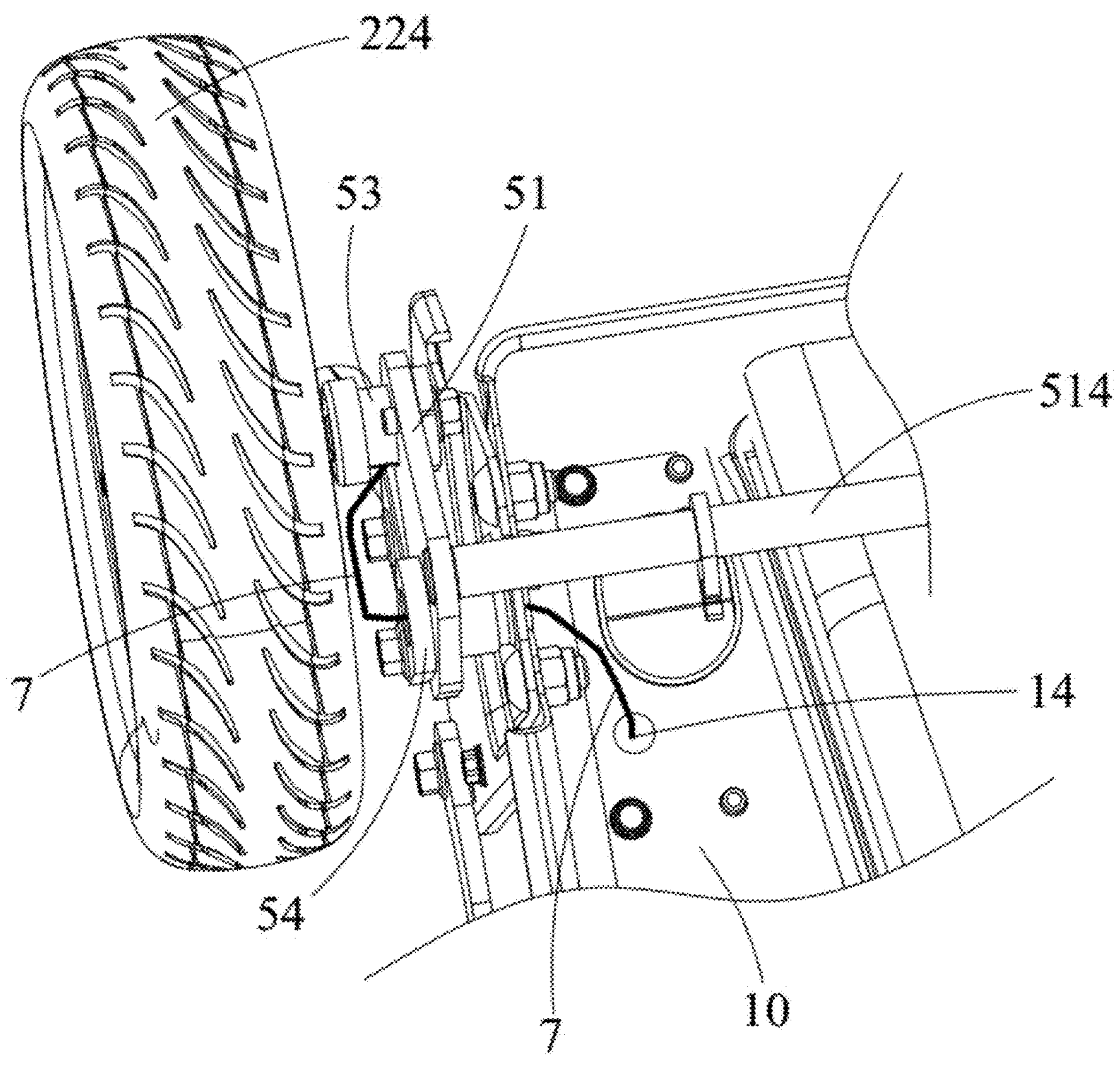
FIG. 12 is a partial enlarged view of a second rear wheel in FIG. 2.

The first fixing component 53 is defined on the fixing plate 51 for housing and fixing the output shaft 41. The output shaft 41 is in a hollow structure for the power cord 7 (and the control line) of the hub motor 40 to pass through. The second fixing component 54 is assembled on the fixing plate 51 for assembling the power cord 7 in the output shaft 41. In one embodiment, the first fixing component 53 and the second fixing component 54 are located on a same side of the fixing plate 51 so as to assemble the power cord 7 within a shortest distance. As shown in FIG. 12, an assembly method of the power cord 7 is: the power cord 7 is led out from the hub motor 40 to the hollow output shaft 41, when the output shaft 41 is housed in the first fixing component 53, the power cord 7 in the output shaft 41 passes through the second fixing component 54 after passing through the first fixing component 53 until it enters an inside of the main body and is fixed.

Please refer to FIG. 6 through FIG. 9, the first fixing component 53 is a hollow structure, and the output shaft 41 is housed in the first fixing component 53 to ensure that the output shaft 41 can be stably mounted on the fixing plate 51, which means that the first fixing component 53 serves as an auxiliary fixing and limiting function. A through groove 532 is arranged on a side wall of the first fixing component 53, and the through groove 532 is used for the power cord in the output shaft 41 to pass through. In some embodiments, the first fixing component 53 and the fixing plate 51 are integrally arranged. The through groove 532 penetrates through the side wall of the first fixing component 53 and is depressed downward along a height of the first fixing component 53, so that the through groove 532 is arranged in a U shape, which is convenient for wiring when the hub motor 40 is mounted.

The second fixing component 54 is also a hollow structure, and the power cord passes through the through groove 532, then enters and passes through the second fixing component 54 until it reaches the bottom of the main body 10. The second fixing component 54 includes a fixing part 541 passing through the fixing plate 51 and the height adjustment bracket 61 at the same time, and a locking part 542 extending outward from the fixing part 541. The locking part 542 is provided with a locking hole 543. The fixing plate 51 is provided with a fixing hole 513 correspondingly, so that a second bolt 56 may be used to pass through the locking hole 543 and the fixing hole 513 to lock and fix the second fixing component 54 on the fixing plate 51.

It should be understood that, for a convenience of description, the bolt that fixes the fixing plate 51 and the fixing base 52 is marked as the first bolt 55 in one embodiment, and the bolt that fixes the fixing plate 51 and the second fixing component 54 is marked as the second bolt 56.

It should be noted: 1. the output shaft 41 is fixed relative to the fixing plate 51 and cannot be rotated, so the power cord may be avoided from winding. 2. The groove 410 on a side wall of the output shaft 41 corresponds to the through groove 532 after mounting, therefore, the fixing plate 51 is not in direct contact with the power cord, and the fixing plate 51 is in contact with the output shaft 41 to protect the power cord.

Please refer to FIG. 12, the bottom of the main body 10 is provided with an opening 14. The power cord 7 passes through the second fixing component 54 and enters the inside of the main body 10 through the opening 14, and then is connected with a power source and a control component inside the main body 10. This wiring method of the power cord 7 is simple and convenient, so that the power cord 7 will not be scratched, the assembly is simple, and the maintenance is convenient.

Figure 13:
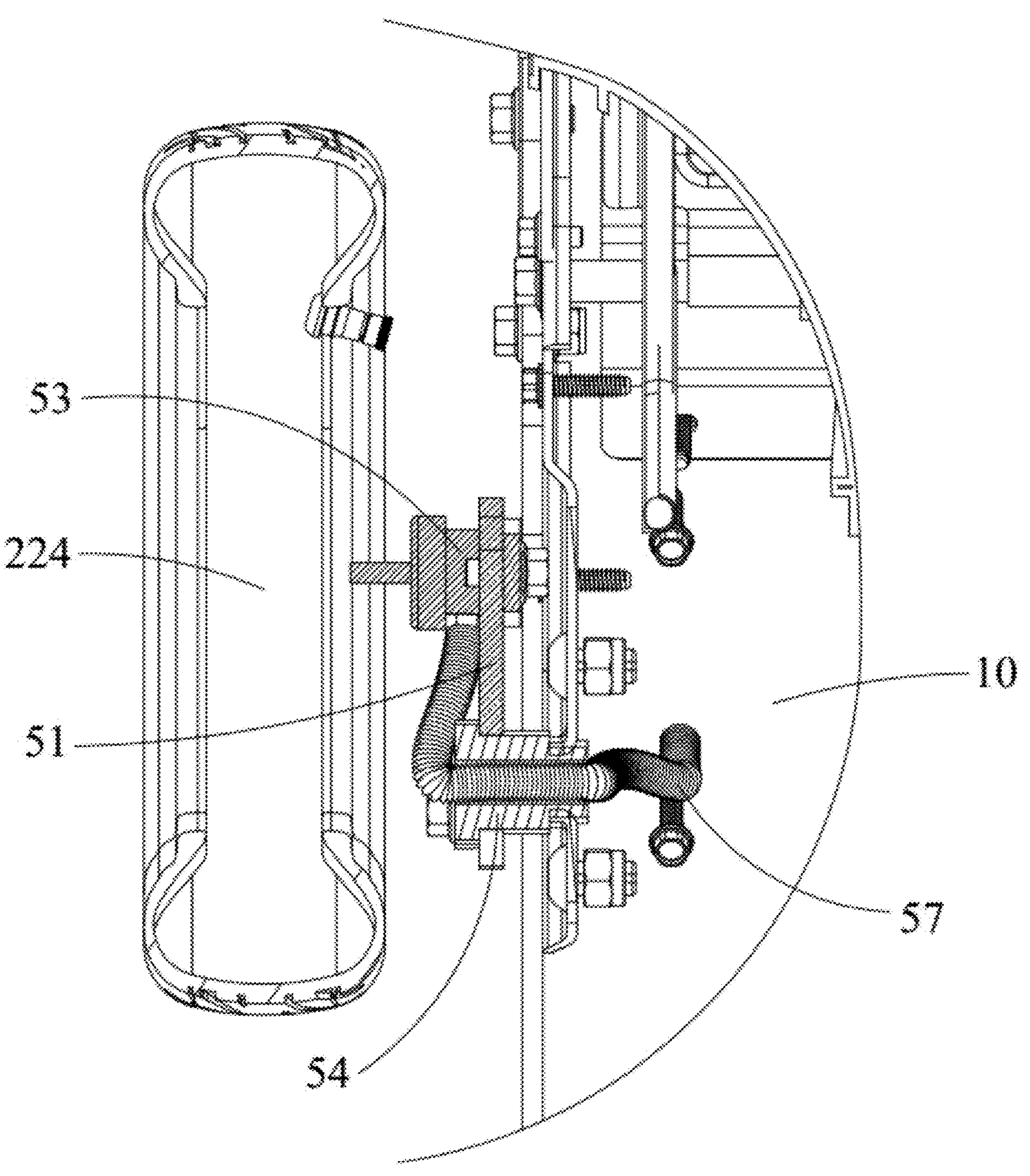
FIG. 13 is a cross sectional view of FIG. 12 with a protective tube.

Please refer to FIG. 13, In order to ensure waterproof performance and facilitate mounting, the fixing assembly 50 further includes a protective tube 57 sleeved outside the power cord 7. One end of the protective tube 57 is connected with the first fixing component 53, and the other end of the protective tube 57 passes through the second fixing component 54 to enter the inside of the main body 10 and is fixedly connected with the main body 10. In some embodiments, the protective tube 57 is a bellow, but it should not be limited to this.

Please refer to FIG. 1 and FIG. 3. The rear wheel 22 is mounted on the height adjustment bracket 61 of the lawn mower 100, so that the height of the rear wheel 22 may be adjusted through a height adjustment structure to facilitate the two blades 11 to mow. In some embodiments, the fixing plate 51 is pivotally connected with the height adjustment bracket 61, and the height adjustment bracket 61 is fixed to the housing of the main body 10 by bolts. When the height needs to be adjusted, an adjustment arm 62 may be directly pulled to drive the fixing plate 51 to rotate.

Figure 10:
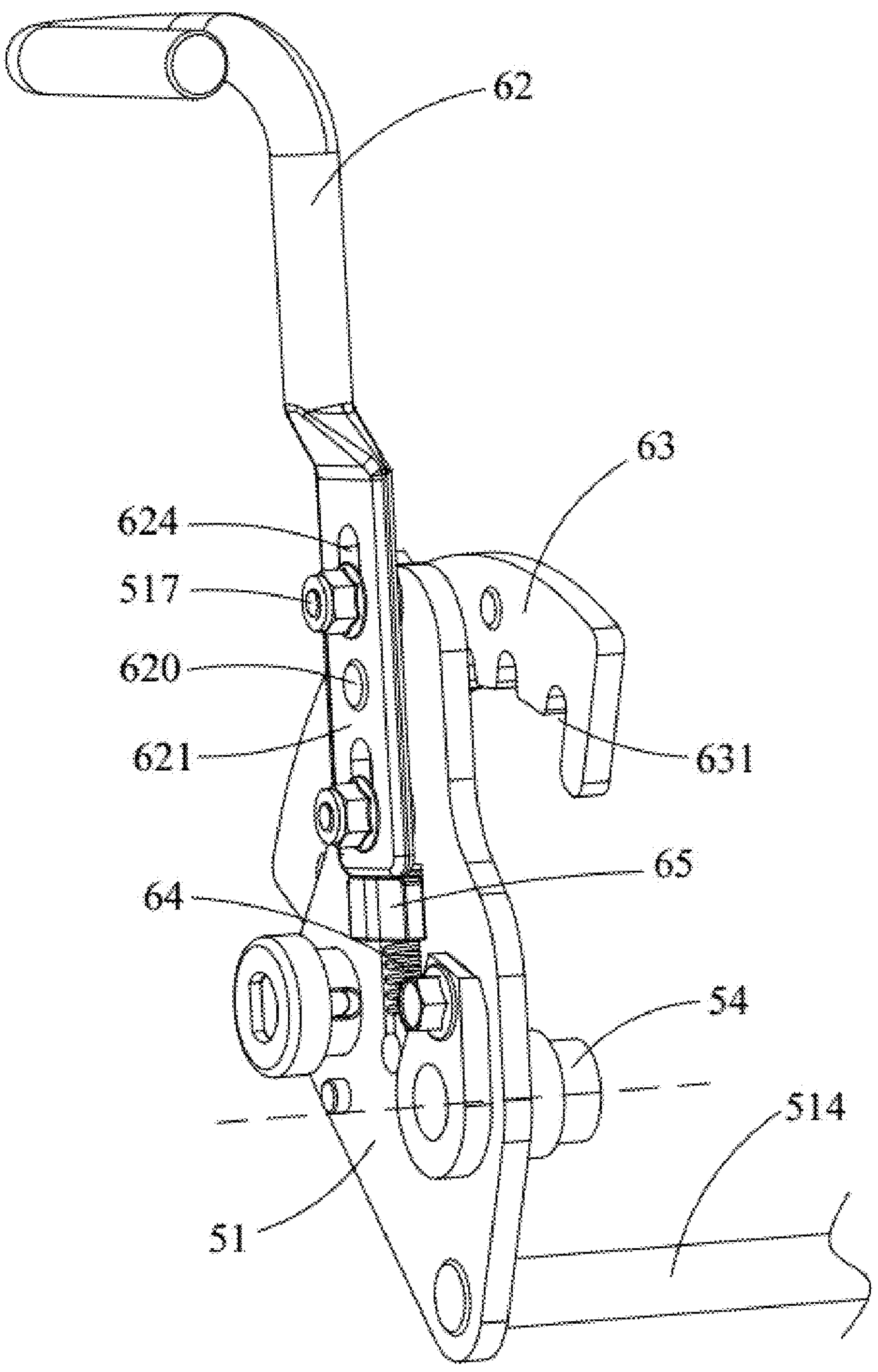
FIG. 10 is a perspective view of a height adjustment structure after assembled in FIG. 4.
Figure 11:
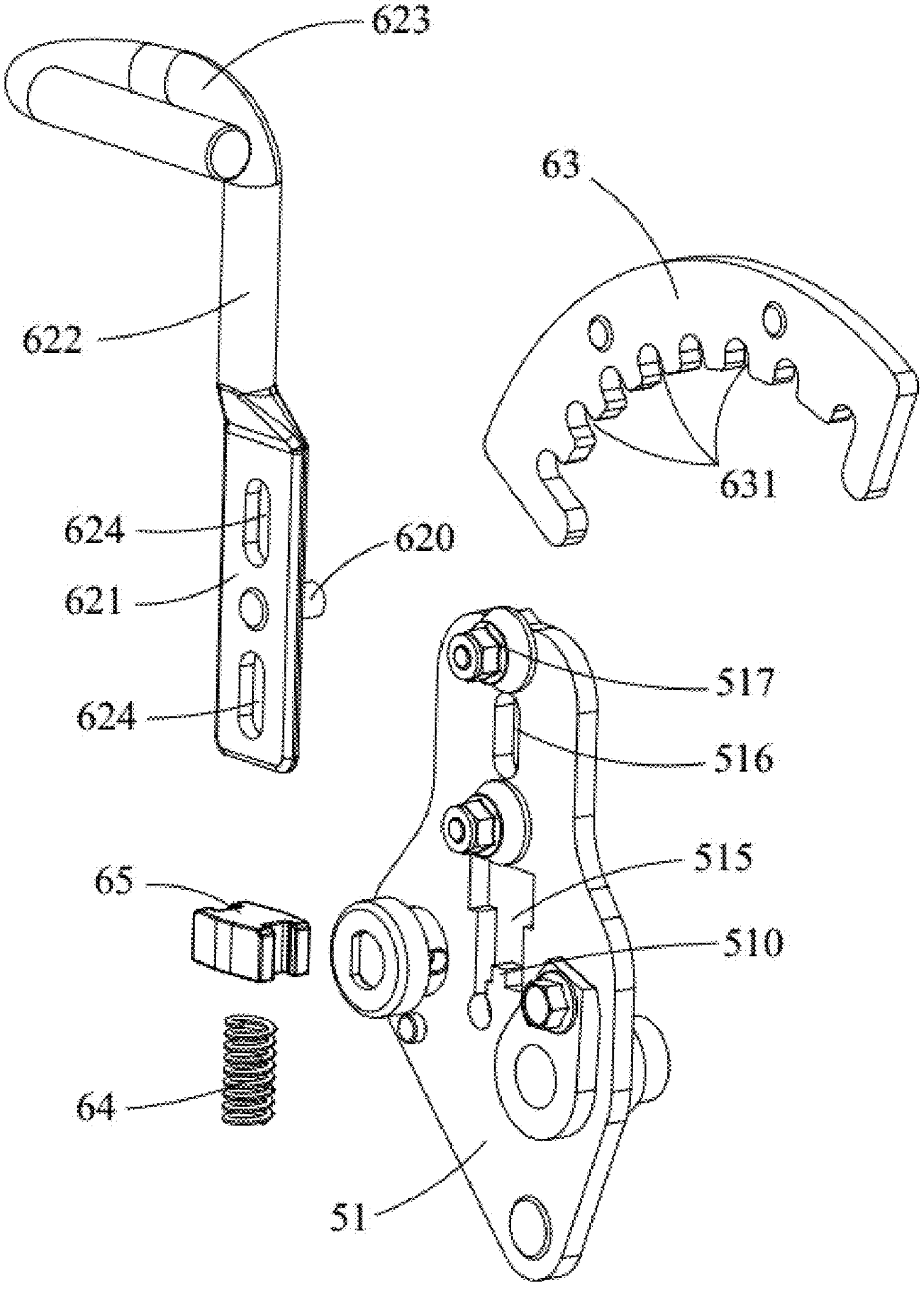
FIG. 11 is an exploded view of FIG. 10.

Please refer to FIG. 10 and FIG. 11. The height adjustment structure includes the fixing plate 51 mentioned above, a gear plate 63 arranged on one side of the fixing plate 51 and capable of being fixed on the main body 10, and the adjustment arm 62 mentioned above. The adjustment arm 62 is arranged on the other side of the fixing plate 51 and substantially above the fixing plate 51 for matching the gear plate 63. In the disclosure, the second fixing component 54 is a rotation center of the height adjustment structure. A height from the rotation center to the bottom of the main body 10 is constant. On the one hand, it is convenient for the fixing plate 51 to rotate relative to the main body 10, and on the other hand, it is convenient for the power cord 7 to directly enter the inside of the main body 10 from the second fixing component 54, and the power cord 7 will not be pulled or wound due to an adjustment of the height of the rear wheel 22.

The gear plate 63 is provided with a plurality of gear grooves 631 with different heights. A lower side of the gear plate 63 is arc-shaped. The gear grooves 631 with different heights are distributed at different positions of the arc, and a center of the arc coincides with the second fixing component 54, so that a distance from each gear grooves 631 to the second fixing component 54 is consistent. The adjustment arm 62 may be operated by the user to match the gear grooves 631 with different heights. A bottom of the adjustment arm 62 is provided with a positioning part 620 which penetrates the fixing plate 51 and matches the gear groove 631 from bottom to top. In one embodiment, the gear groove 631 is a positioning notch arranged at a bottom of the gear plate 63, but it should not be limited herein.

The height adjustment structure further includes an elastic component 64 elastically arranged between the adjustment arm 62 and the fixing plate 51, and a pushing slider 65 located between the elastic component 64 and the adjustment arm 62. The fixing plate 51 is provided with a housing cavity 515 for housing the pushing slider 65 and the elastic component 64. In an initial state, an elastic force of the elastic component 64 keeps the positioning part 620 in the corresponding gear groove 631, after the adjustment arm 62 is pressed down, the elastic component 64 is compressed until the positioning part 620 is out of the current gear groove 631 for gear shifting. In other words, the adjustment arm 62 is operable to move on the fixing plate 51 so that the positioning part 620 is located in or out of the gear groove 631. In one embodiment, the elastic component 64 is a compression spring. One end of the elastic component 64 is sleeved on a protrusion block 510 at a bottom of the housing cavity 515, and the other end of the elastic component 64 elastically resists into a mounting groove (not shown) at a bottom of the pushing slider 65. Of course, this should not be limited herein. The pushing slider 65 is resisted by the bottom of the adjustment arm 62, so that the pushing slider 65 can only move at a lower end of the housing cavity 515 to prevent the pushing slider 65 from falling out of the housing cavity 515.

The adjustment arm 62 includes a matching part 621 extending in a up and down direction and matching the fixing plate 51, an extension part 622 extending upward from the matching part 621, and an operating handle 623 extending upward from the extension part 622. The operating handle 623 bends and extends in a horizontal direction perpendicular to the up and down direction to define a shape that is convenient for the user to operate. The extension part 622 is further away from the main body 10 in the horizontal direction than the matching part 621. The matching part 621 is provided with a strip-shaped first sliding groove 624. The adjustment arm 62 is movably connected in a vertical direction with the fixing plate 51 through the first sliding groove 624. In one embodiment, there are two first sliding grooves 624, the two first sliding grooves 624 are arranged at intervals in the vertical direction, and the positioning part 620 is arranged between the two first sliding grooves 624. The fixing plate 51 is provided with a strip-shaped second sliding groove 516. After the positioning part 620 passes through the second sliding groove 516, it matches the gear groove 631. The positioning part 620 may move in the second sliding groove 516 along the vertical direction.

The fixing plate 51 is further provided with a protrusion part 517. There are correspondingly two protrusion parts 517 and they are arranged at intervals in the vertical direction. In one embodiment, each protrusion part 517 includes a protrusion column and a nut for locking and fixing the protrusion column. After the protruding column passes through the corresponding first sliding groove 624, the protruding column is fixedly connected with the matching part 621 through a nut. Of course, when the operating handle 623 is pressed, the whole protruding part 517 may move up and down along the first sliding groove 624, and at the same time, the positioning part 620 may also move up and down along the second sliding groove 516.

A specific operation mode of the height adjustment structure is: first, press down the adjustment arm 62, so that the positioning part 620 may be quickly separated from the current gear groove 631, then turn the adjustment arm 62 back and forth to enable the fixing plate 51 to rotate together, at the same time, the two rear wheels 22 rotate synchronously, after selecting a suitable working height, loosen the adjustment arm 62, under an action of a restoring force of the compression spring 64, the pushing slider 65 pushes the positioning part 620 to be quickly fixed with the corresponding gear groove 631, at this time, a height adjustment between the wheel axle of the rear wheel 22 and the ground is realized, which saves time and effort.

In this disclosure, the hub motor 40 is powered by a power source of the lawn mower 100. Through designing the wiring method of the power cord 7, it is possible to avoid an impact on the power cord 7 in a process of the adjustment of the height of the rear wheel 22. The reason is that since the fixing plates 51 of the two rear wheels 22 are connected together through the connecting shaft 514, when the height of one of the rear wheels 22 is adjusted, the other rear wheel 22 may also rotate to realize an adjustment of a mowing height. Since the second fixing component 54 is the rotation center when the height of the rear wheel 22 is adjusted, a part of the power cord 7 from the through groove 532 to the second fixing component 54 is fixed relative to the fixing plate 51, which will not affect the power cord 7 when the height is adjusted. At the same time, a part of the power cord 7 from the second fixing component 54 to the opening 14 is also fixed relative to the main body 10, so the power cord 7 will not be pulled or wound when the height is adjusted.

In summary, on the one hand, the lawn mower 100 of the disclosure is provided with the hub motor 40 in the rear wheel 22 and the hub motor 40 is set as the outer rotor motor, so that the hub motor 40 may be configured to drive the rear wheel 22 to rotate to achieve the self-propelled of the lawn mower 100. On the other hand, the hub motor 40 may be configured to adjust the self-propelled speed of the lawn mower 100. Compared with the conventional art, the lawn mower 100 of the disclosure does not need to be provided with a deceleration device, which not only saves a volume occupied by the deceleration device, enables the structure of the lawn mower 100 to be more compact and saves space, but also avoids an energy loss caused by a multi-stage transmission at the same time.

In addition, the fixing assembly 50 includes a fixing plate 51 and a fixing base 52 assembled and fixed with the fixing plate 51, so that the output shaft 41 of the hub motor 40 may be configured to pass through the through hole 511 on the fixing plate 51 and the housing hole 521 on the fixing base 52 to realize the fixed connection between the hub motor 40 and the main body 10. Furthermore, when the hub motor 40 is damaged, it is only necessary to disassemble the rear wheel 22 and replace it with a new one. A repair of the hub motor 40 may be carried out later without affecting use.

Furthermore, the first fixing component 53 and the second fixing component 54 are arranged on the fixing plate 51, so that the power cord 7 in the output shaft 41 may penetrate from the first fixing component 53 and pass through the second fixing component 54 until the power cord 7 enters the inside of the main body 10, which simplifies the wiring assembly problem of the hub motor 40, so that the mounting of the hub motor 40 is easier and more convenient, and the maintenance is more convenient.

The above embodiments are only configured to illustrate the technical solutions of the disclosure and do not to limit it. Although the disclosure has been described in detail with reference to preferred embodiments, those of ordinary skill in the art should understand that the technical solutions of the disclosure may be modified or equivalently replaced without departing from the spirit and scope of the technical solutions of the disclosure.

What is claimed is:

1. An outdoor work tool, comprising:

a main body, a cutter assembly, configured to realize a mowing function of the outdoor work tool, a power assembly, configured to supply power to the cutter assembly, and two or more wheels, configured to support the main body and drive the main body to move, the two or more wheels comprising at least two driving wheels and at least one driven wheel, wherein each driving wheel is provided with a hub motor, the hub motor is an outer rotor motor, an output shaft of the hub motor is coupled with the respective driving wheel through a motor body of the hub motor, so that the hub motor rotates coaxially with the respective driving wheel, an outer diameter of the driving wheel is from 10.16 cm to 38.1 cm, and a rotation speed of the hub motor is less than or equal to 563 r/min;

the main body is provided with a fixing assembly to fix the hub motor, the fixing assembly comprises a fixing plate and a fixing base connected with the fixing plate, the fixing plate is provided with a through hole for the output shaft of the hub motor to pass through, the fixing base is correspondingly provided with a housing hole, and the output shaft is partially housed in the housing hole after passing through the through hole to realize a connection between the hub motor and the main body.

2. The outdoor work tool according to claim 1, wherein a rotation speed of the hub motor is from 100 r/min to 200 r/min.

3. The outdoor work tool according to claim 1, wherein a rated power of the hub motor is from 50 W to 120 W.

4. The outdoor work tool according to claim 1, wherein an angular velocity of the hub motor is the same as an angular velocity of the driving wheel.

5. The outdoor work tool according to claim 1, wherein the two or more wheels comprise a pair of front wheels located on the front of the main body served as the driven wheels and a pair of rear wheels located on the rear of the main body served as the driving wheels, each rear wheel is provided with the hub motor, and the fixing assembly further comprises a connecting shaft connecting the two rear wheels.

6. The outdoor work tool according to claim 5, wherein two fixing plates and two fixing bases are provided respectively, so as to correspondingly connect with the hub motors in the two rear wheels, and two ends of the connecting shaft are respectively connected with bottoms of the two fixing plates.

7. The outdoor work tool according to claim 6, wherein the connecting shaft is integrally arranged with the two fixing plates.

8. The outdoor work tool according to claim 1, wherein a first fixing component and a second fixing component are arranged on an end surface of the fixing plate on a same side, and a part of the output shaft exceeding the housing hole is housed in the first fixing component, the first fixing component and the second fixing component are both hollow structures, and a power cord in the output shaft passes through the second fixing component after passing through the first fixing component until entering into the main body.

9. The outdoor work tool according to claim 8, wherein the fixing assembly further comprises a protective tube sleeved on an outside of the power cord, one end of the protective tube is connected with the first fixing component, and the other end of the protective tube passes through the second fixing component, enters into the main body and is connected with the main body.

10. The outdoor work tool according to claim 8, wherein the output shaft is a hollow structure, a side wall of the output shaft is provided with a groove, a side wall of the first fixing component is provided with a U-shaped through groove, and the groove corresponds to the through groove to enable the power cord in the output shaft to pass through the first fixing component from the groove and the through groove.

11. The outdoor work tool according to claim 1, wherein an end of the output shaft is a milled structure, and a cross section of the through hole matches a cross section of the end of the output shaft.

12. The outdoor work tool according to claim 11, wherein one side of the output shaft is a flat key structure, so that a cross section of the output shaft is D-shaped, and the cross section of the through hole is correspondingly D-shaped.

13. The outdoor work tool according to claim 12, wherein the other side of the output shaft is provided with a notch, and the housing hole is U-shaped, so that when the output shaft is housed in the housing hole, an inner side wall of the housing hole is locked and fixed with the notch.

14. The outdoor work tool according to claim 13, wherein the housing hole is depressed downwardly from a top of the fixing base, so that the fixing base fixes the end of the output shaft from bottom to top.

15. The outdoor work tool according to claim 8, wherein the first fixing component is integrally provided with the fixing plate, and the second fixing component fixes the fixing plate to the main body.

16. The outdoor work tool according to claim 15, wherein the second fixing component comprises a fixing part passing through the fixing plate and the main body at the same time, and a locking part extending outward from the fixing part, the locking part is provided with a locking hole, and the fixing plate comprises a fixing hole to allow a bolt to pass through the locking holes and the fixing holes to lock and fix the second fixing component on the fixing plate.

17. The outdoor work tool according to claim 1, wherein the fixing base is further provided with a first mounting hole for a bolt to pass through, the fixing plate comprises a second mounting hole, so that a bolt passes through the first mounting hole and the second mounting hole to fix the fixing base with the fixing plate.

18. The outdoor work tool according to claim 1, further comprising a detection device, wherein the detection device is configured to detect a rotation speed of the hub motor.

* * * * *